(No Model.)
C. F. BRACKETT.
DYNAMOMETER.
No. 302,976. Patented Aug. 5, 1884.
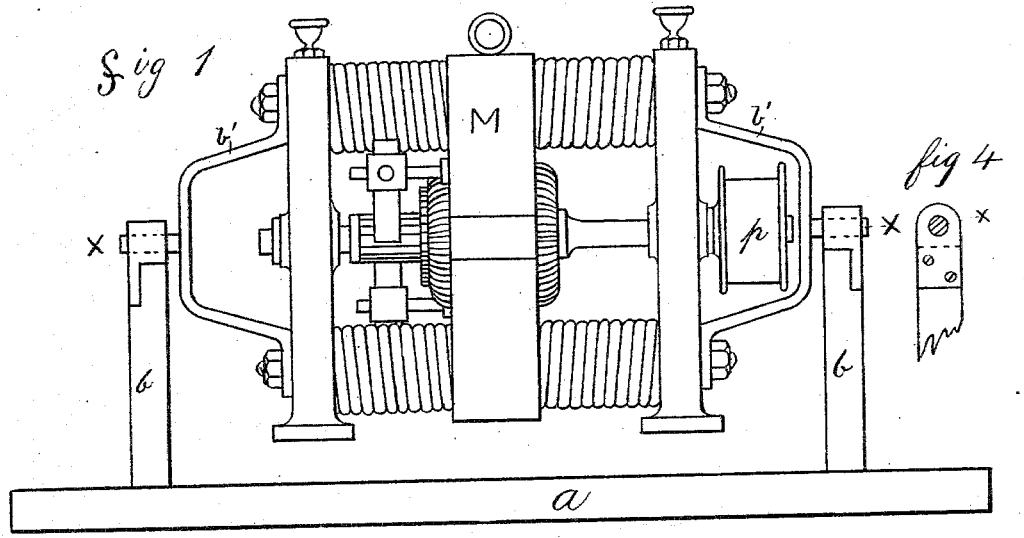
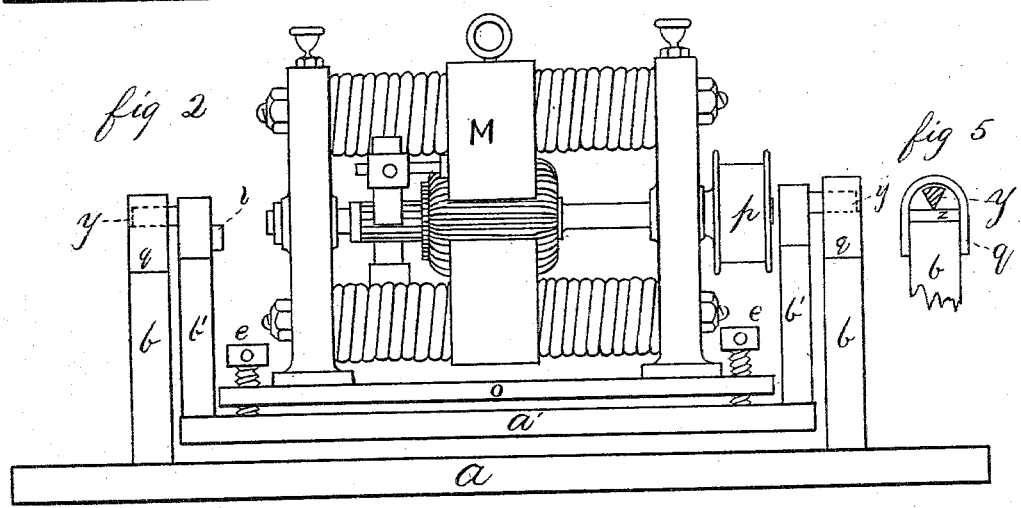
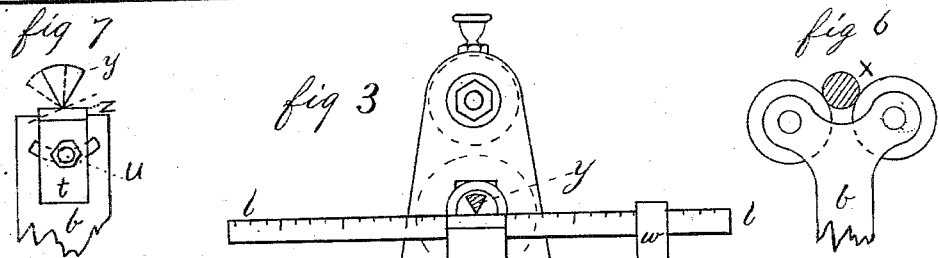
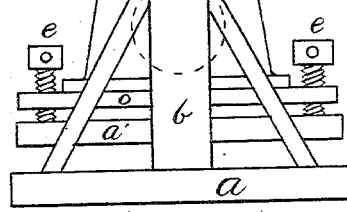
Witnesses
M. F. Kenyon
Alan D. Kenyon
Inventor
Cyrus F. Brackett
by W. E. Willer
his Atty

UNITED STATES PATENT OFFICE.

CYRUS F. BRACKETT, OF PRINCETON, NEW JERSEY.

DYNAMOMETER.

SPECIFICATION forming part of Letters Patent No. 302,976, dated August 5, 1884.

Application filed November 19, 1883. (No model.)

*To all whom it may concern:*

Be it known that I, CYRUS F. BRACKETT, a citizen of the United States, residing at Princeton, in the county of Mercer and State of New Jersey, have invented a certain new and useful Improvement in Dynamometers, of which the following is a specification.

My invention relates to the measurement of the mechanical energy expended on or delivered by certain machines, of which magneto and dynamo machines with revolving armatures are examples, though it is by no means limited to these latter, but may be applied as well to any machine in which a revolving part tends to make the whole machine or some other member of it revolve.

The principle of my invention consists in equating the mechanical couple which causes the rotation involved in working the machine—say the dynamo-machine—with another couple, equal in value but opposite in direction, and whose factors of force and lever-arm are readily determined. We have then only to take the product of the circumference of the circle whose radius is the lever-arm, so determined, in feet, by the force in pounds and by the number of revolutions in a minute, in order to find the energy expended in a minute. In a former patent granted to me November 6, 1883, and numbered 287,800, I have shown a method and means of measuring the mechanical couple set up between the armature and the magnets of a dynamo or magneto electric machine, whether used as a generator or as a motor, resulting from the magnetic action of these parts upon each other, by which I was enabled to measure the amount of power that was actually utilized to produce the magnetic action in the one case or that was actually produced by the magnetic action in the other case. My present method takes into account the mechanical couple resulting from the action of every part of the machine, including bearings, commutator, &c., and, in short, any work, useful or otherwise, done in a machine by the revolution of one of its parts. I am thus enabled to measure the amount of power actually consumed in a machine or produced by a machine of any kind that operates by rotation of one of its parts, whether it be a machine operating by magnetic action or not, and thus I arrive with the greatest accuracy at a measure of the power introduced into the machine or derived from the machine.

I practically apply this principle by mounting the machine on a cradle of suitable construction to hold it, which cradle is supported upon knife-edges of steel or other suitable material, or upon cylinders which can roll with little friction; or it may be supported by any equivalent device which will leave the cradle free to turn with its load about the centers of support. I preferably make the cradle adjustable, so that machines of different forms and dimensions may be carried by it, and yet have the line which joins the two opposite points of support pass through the axis of the revolving part—say, of the armature of a dynamo-machine. In some cases the timbers of the cradle usually employed may be dispensed with, only the uprights with their attached knife-edges, cylinders, &c., being needed, and these may be attached directly to the machine at some suitable points, always so that the axis of rotation shall coincide with a line joining the points of support. To the cradle or to the machine itself is attached a lever-arm, along which sliding weights or springs may be adjusted, so as to hold the machine in its position notwithstanding the couple involved in its operation.

Reference to the accompanying drawings, which form a part of this specification, will make the application of the principle herein set forth clear.

Figure 1 shows a machine of the Gramme type, supported on two uprights, $b$, by means of cylindrical bearings $x$, which can turn freely in boxes at the top of the uprights, and which are firmly attached to the strong iron straps or supports $b'$, which in turn are secured to the ends of the machine by bolts and nuts, the details of which are shown in Fig. 4. Fig. 2 shows a similar machine mounted on an adjustable cradle, $a'$, which is carried by fixed supports $b$, in the same general manner as the machine is carried in Fig. 1. The cradle has two uprights or supports, $b'$, to each of which is fixed at its upper end a steel knife-edge, $y$, of which an end view is shown in Fig. 5. The knife-edges rest on steel plates $z$, with which the standards $b$ and $b$ terminate. Fig. 5 shows one of these knife-edges resting on its steel plate $z$, and shows also the band $q$, which serves to prevent accidental displacement. The same construction is adopted at both ends of the cradle. The machine rests directly on the platform o, which is furnished with adjusting-screws e at the corners. By means of these screws the machine may be leveled and raised or lowered, so as to make the line of the axis about which the armature revolves coincide with the knife-edges. A lever, l, is attached to one of the supports b', or directly to the machine itself, by means of which and of the weight w the equating couple is applied. Fig. 3 presents an end view of the cradle with a machine mounted upon it and with a lever, l, attached, carrying a weight, w, which can be adjusted so as to bring the machine, when running, into its position of equilibrium. In Fig. 6 is shown a cylindrical mounting, x, resting on two friction-rollers, which may, if desired, be substituted for the mode of mounting shown in Figs. 1 and 2. Fig. 7 shows a plan of mounting the cradle or machine, which may be employed when the traction of the driving-belt is not in the vertical line. An accessory piece, t, is added to each of the plates z, being continuations of the plates z down the sides of the uprights b. These uprights have slots along the arc of a circle whose center is at the upper surface of the plate z. The pieces t have similar slots, arranged so that the upper surfaces of b shall not interfere with any desired angular position of the plates z. Through these slots passes a bolt, u, carrying a clamping-nut. This arrangement allows the plate z to be adjusted, so as to lie in a plane perpendicular to the resultant of the weight of the cradle and its load and the traction of the belt. Thus displacement as well as undue friction is avoided.

Having now described my invention and pointed out methods of its application, what I claim as new, and desire to secure by Letters Patent, is—

1. The combination, with a machine whose operation proceeds by the rotation of one of its parts in bearings furnished by the other part, said machine having attached to it on either side suitable supporting fixtures and bearings, b' b' x x, of fixed standards or supports b b, and a lever, l, and weight w, attached to the machine, all connected substantially as and for the purposes set forth.

2. The combination, with a machine whose operation proceeds by a rotation of one part of the machine in bearings furnished by the other part of the machine, of a cradle adapted to carry the machine, and standards or supports furnishing bearings for the cradle in the line of the axis of rotation of the revolving part of the machine, and means of measuring the tendency of the cradle to revolve, all connected as described, whereby the couple set up between the parts of the machine may be measured, substantially as shown and described.

3. The combination, with a machine whose operation proceeds by a rotation of one part of the machine in bearings furnished by the other part of the machine, of a cradle adapted to carry the machine on an adjustable table or floor, and of standards or supports furnishing bearings for the cradle, and of means of measuring the tendency of the cradle to revolve, whereby the couple set up between the parts of the machine may be measured, substantially as shown and described.

4. The combination, with a machine whose operation proceeds by a rotation of one part of the machine in bearings furnished by the other part of the machine, of a cradle adapted to carry the machine on an adjustable table or floor, and of standards or supports furnishing bearings for the cradle, the cradle or machine having a lever arm or arms attached, and adjustable weights or springs, all connected as described, whereby the couple set up between the parts of the machine may be measured, substantially as shown and described.

5. In an apparatus for measuring the energy introduced into a dynamo or magneto electric machine when used as a generator, or derived from such a machine when used as a motor, a cradle adapted to carry the machine and mounted on fixed standards or supports, so that it can freely turn through a small arc of a circle whose center lies in the line of the axis of rotation of the revolving part of the machine, substantially as and for the purposes set forth.

6. In an apparatus for measuring the energy introduced into a dynamo or magneto electric machine derived from an electric motor, a cradle adapted to carry the machine on an adjustable table or floor, and mounted on fixed standards or supports, so that it can freely turn through a small arc of a circle whose center lies in the line of the axis of rotation of the revolving part of the machine, substantially as and for the purposes set forth.

7. The combination of the cradle a' b' b', having knife-plates y, the standards a b b, having plates z, and the lever l and weight w, substantially as and for the purposes set forth.

8. The combination of the cradle a' b' b', having adjustable floor or table o, and knife-plates y, the standards a b b, having plates z, and the lever l and weight w, substantially as and for the purposes set forth.

9. The combination of the cradle a' b' b', having adjustable floor or table o, and knife-plates y, the standards a b b, having adjustable plates z, and the lever l and weight w, substantially as and for the purposes set forth.

CYRUS F. BRACKETT.

Witnesses:
WILLIAM C. HICKS,
C. A. YOUNG.